United States Patent
Byrne

(10) Patent No.: US 10,015,735 B1
(45) Date of Patent: Jul. 3, 2018

(54) SELECTING DATA ANCHOR POINT BASED ON SUBSCRIBER MOBILITY

(71) Applicant: T-Mobile USA, Inc., Bellevue, WA (US)

(72) Inventor: Cameron Byrne, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/394,418

(22) Filed: Dec. 29, 2016

(51) Int. Cl.
*H04W 48/18* (2009.01)
*H04W 8/18* (2009.01)
*H04W 4/02* (2018.01)
*H04W 88/16* (2009.01)

(52) U.S. Cl.
CPC ........... *H04W 48/18* (2013.01); *H04W 4/028* (2013.01); *H04W 4/029* (2018.02); *H04W 8/18* (2013.01); *H04W 88/16* (2013.01)

(58) Field of Classification Search
CPC .... H04W 64/006; H04W 48/17; H04W 48/18
See application file for complete search history.

(56) References Cited

U.S. PATENT DOCUMENTS

| 2009/0061848 A1* | 3/2009 | Hurst | H04W 64/006 |
| | | | 455/425 |
| 2013/0208661 A1* | 8/2013 | Nylander | H04W 48/17 |
| | | | 370/328 |

* cited by examiner

*Primary Examiner* — Myron K Wyche
(74) *Attorney, Agent, or Firm* — Lee & Hayes, PLLC

(57) ABSTRACT

The techniques described herein provide a solution for selecting either one of a distributed network architecture or a centralized network architecture to provide network access to a user. Historical mobility data and contextual mobility data of the user is collected and analyzed to generate a mobility score. The mobility score will be used as a basis to determine whether a distributed network architecture or a centralized network architecture be used for the user to access an external packet data network.

20 Claims, 7 Drawing Sheets

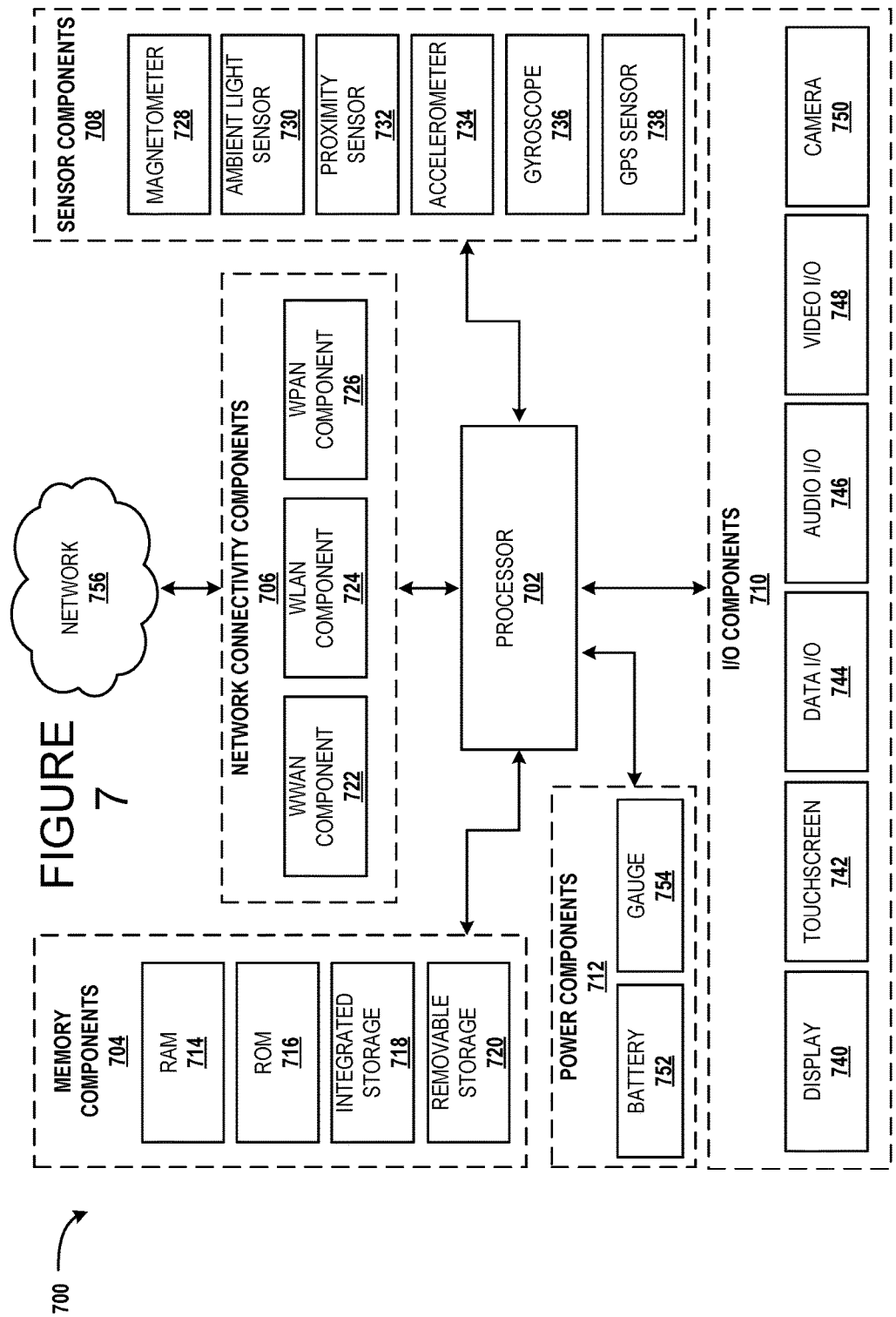

SELECTING DATA ANCHOR POINT BASED ON SUBSCRIBER MOBILITY

BACKGROUND

Under the LTE (long term evolution) telecommunications standard, Internet Protocol (IP) is the key protocol to transport all services and LTE supports only packet switching with its all-IP (Internet Protocol) network. In an LTE (or LTE Advanced) system, the Evolved Packet Core (EPC) is the latest evolution of the 3GPP core network architecture.

The EPC includes four network elements: Serving Gateway ("SGW"), Packet Data Network Gateway ("PDN GW" or "PGW"), Mobility Management Entity (MME) and Home Subscriber Server (HSS). In an Evolved Packet System (EPS) under LTE, a user equipment (UE) is connected to the EPC over E-UTRAN (LTE access network) which includes Evolved NodeB ("eNodeB"/"eNB") as the base station for LTE radio signal. The eNodeBs provide E-UTRA user plane (PDCP/RLC/MAC/PHY) and control plane (RRC) protocol terminations toward a user equipment (UE). The eNodeBs are interconnected with each other. A user equipment is connected to the EPC through eNodeBs, and is then connected to external networks through the EPC. Specifically, a UE is connected to an eNodeB(s), eNodeBs are connected to both the MME and the SGW of the EPC, the SGW is logically connected to the PGW, and the PGW is connected to external packet data networks. MME is the key control node in EPC and controls, among others, the selection of PGW(s) for a UE to access external packet data networks. HSS is basically a database that contains user-related and/or subscriber-related information, which may provide support functions in, e.g., mobility management.

BRIEF DESCRIPTION OF THE DRAWINGS

To describe technical solutions in the embodiments of the present disclosure more clearly, the accompanying drawings are briefly described herein. The accompanying drawings described herein merely represent some examples of the present disclosure, and one of ordinary skill in the art may further derive other drawings from these accompanying drawings without making any creative effort. The use of the same reference numbers in different figures indicates similar or identical items.

FIG. 7 illustrates a computer architecture diagram illustrating an example computing device architecture for a computing device capable of implementing aspects of the techniques and technologies presented herein.

DETAILED DESCRIPTION

The disclosure provides a solution to providing network access to a subscriber through efficiently selecting a data anchor point based on a mobility score of a subscriber. In the following detailed description, references are made to the accompanying drawings that form a part hereof, and in which are shown by way of illustration specific configurations or examples, in which like numerals represent like elements throughout the several figures.

Figure 1:
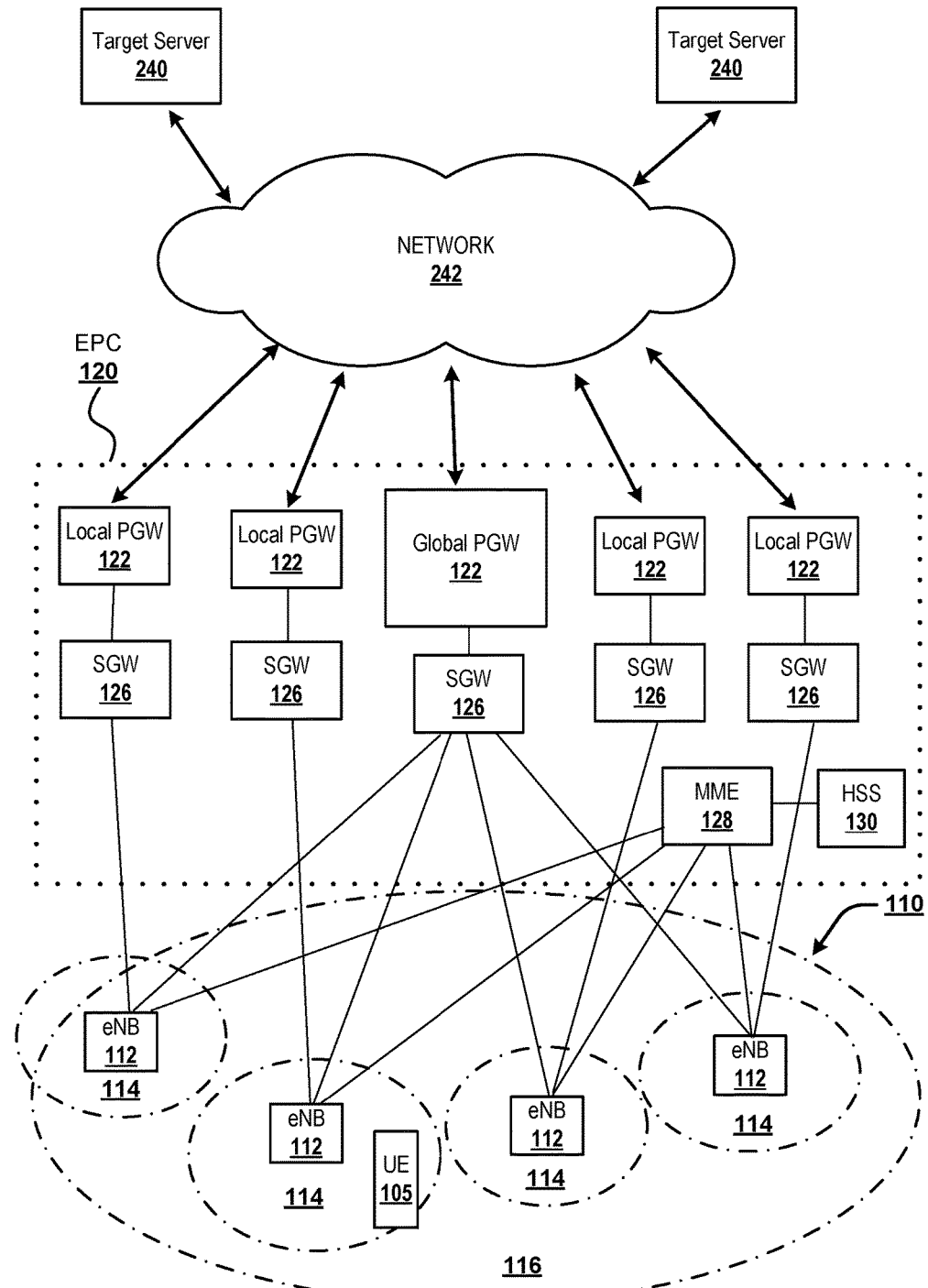
FIG. 1 illustrates an example Evolved Packet System.

FIG. 1 illustrates an example Evolved Packet System 100 including an example subscriber(s) (illustrated as under equipment "UE") 105, an example radio access network(s) 110 illustrated as an example E-UTRAN access network(s), an example Evolved Packet Core(s) (EPC) 120, an example target server(s) 140 and an example external packet data network(s) 142. Radio access network(s) 110 includes multiple base stations 112 illustrated as example eNodeBs, each covering one or more local area referred to as "cell site" 114. Cell sites 114 of different eNodeBs 112 may overlap. EPC 120 may include both a distributed/decentralized mobile network architecture and a centralized mobile network architecture for data anchoring. For distributed data anchoring architecture, EPC 120 may include multiple local data anchor points/gateways 122 illustrated as example local PDN GW. Each local data anchor gateway 122 is associated to one or more, but not all, base station(s) 112 of a global area/region 116 and the corresponding cell site(s) 114. For centralized anchoring architecture, EPC 120 includes global data anchor point/gateway 124 illustrated as global PDN GW 124. Global data anchor gateway 124 is associated with all base stations 112 and the corresponding cell site 114 of global area/region 116. Local cell sites 114 may be fully enclosed within global area 116 or may be partially enclosed within global area 116. For the purpose of selecting data anchor points between global data anchor gateway 124 and local data anchor gateway 122, the local cell sites 114 of relevant local data anchor gateways 122 at least partially overlap with and cover a local area smaller than a global area 116 associated to global data anchor gateway 124.

Each local data anchor gateway 122 and global data anchor gateway 124 is associated with a corresponding example serving gateway 126. It should be appreciated that although FIG. 1 shows as an illustrative example that a data anchor gateway 122/124 is associated one-to-one to a serving gateway 126, this architecture is not necessary. It is possible that a serving gateway 126 does not collocate with data anchor gateway 122/124 and/or is associated with multiple data anchor gateways 122/124. It is also possible that EPC 120 includes no separate serving gateway 126, the function of which being incorporated into data anchor gateway 122/124 and/or other elements of EPC 120. All such possibilities are included in the disclosure and should not limit the disclosure. Local data anchor gateway 122 and/or global data anchor gateway 124 may server as the interconnection point/network access point to connect to target server(s) 140 through external packet data network(s) 142.

A subscriber 105 may include any unit of subscription defined by a service provider, e.g., a telecommunication carrier company. In an example, subscriber 105 may include at least one of a user, a subscribed user equipment, or a user account registered with a service provider. In an example, a subscriber 105 may be a basic item that a server provider or a third party data service collects and maintains data for. For example, in the case subscriber 105 is a user equipment, a service provider may collect usage data and other data including historical mobility data and/or contextual mobility data of the user equipment.

EPC 120 also includes one or more MME 128 and one or more HSS 130.

In the disclosure herein, example Evolved Packet System 100 is used as an illustrative example to facilitate the description of providing network access to a subscriber 105 through efficiently selecting a data anchor point based on a mobility score of the subscriber 105. The specific architecture and/or components/units/elements of example Evolved Packet System 100 shall not limit the scope of the disclosure. For example, radio access network 110 may also support GERAN (radio access network of GSM/GPRS) and UTRAN (radio access network of UMTS-based technologies WCDMA and HSPA) and non-3GPP accesses.

1. Example Systems and Environments

Figure 2:
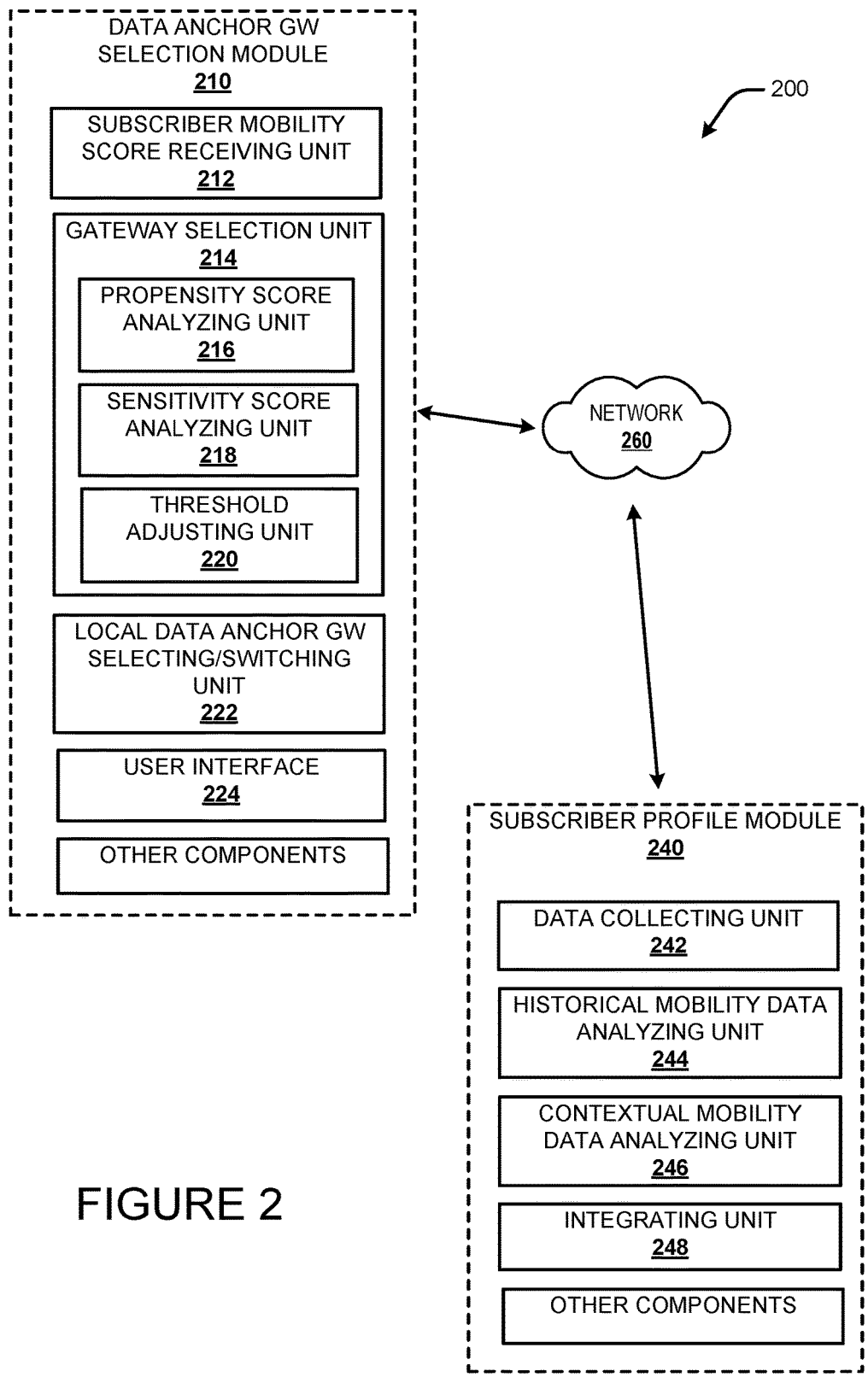
FIG. 2 illustrates an example system for selecting data anchor points based on subscriber mobility.

FIG. 2 illustrates a system diagram showing aspects of one illustrative example system disclosed herein for providing network access to a subscriber through selecting a data anchor point based on a mobility score of the subscriber. As shown in FIG. 2, a data anchor gateway selection system 200 (hereinafter "system 200") may include a data anchor gateway selection module 210 and a subscriber profile module 240. Data anchor gateway selection module 210 may further include a subscriber mobility score receiving unit 212, a gateway selection unit 214, a local data anchor gateway selection/switching unit 222, a user interface 224 and other components. Data anchor gateway selection unit 214 may further include a propensity score analyzing unit 216, a sensitivity score analyzing unit 218 and a threshold adjusting unit 220. Subscriber profile module 240 may include a data collection unit 242, a historical mobility data analyzing unit 244, a contextual mobility data analyzing unit 246 and an integrating unit 248.

Data anchor gateway selection module 210 and subscriber profile module 240 and the units thereof may reside in a single computing system or may communicate to one another through network 260. Further, data anchor gateway selection module 210 and subscriber profile module 240 and any of the units thereof may reside within EPC 120 or may reside in a separate server (not shown in FIG. 2) and communicatively coupled to EPC 120. In an example, data anchor gateway selection module 210 may reside in MME 128 and/or may be communicatively coupled to MME 128. Subscriber profile module 240 may reside in HSS 130, and/or may be communicatively coupled to HSS 130. In another example, some or all units of system 2200 may reside in a user equipment of subscriber 105 as an application portal provided by a service provider, e.g., a telecommunications carrier company.

Figure 3:
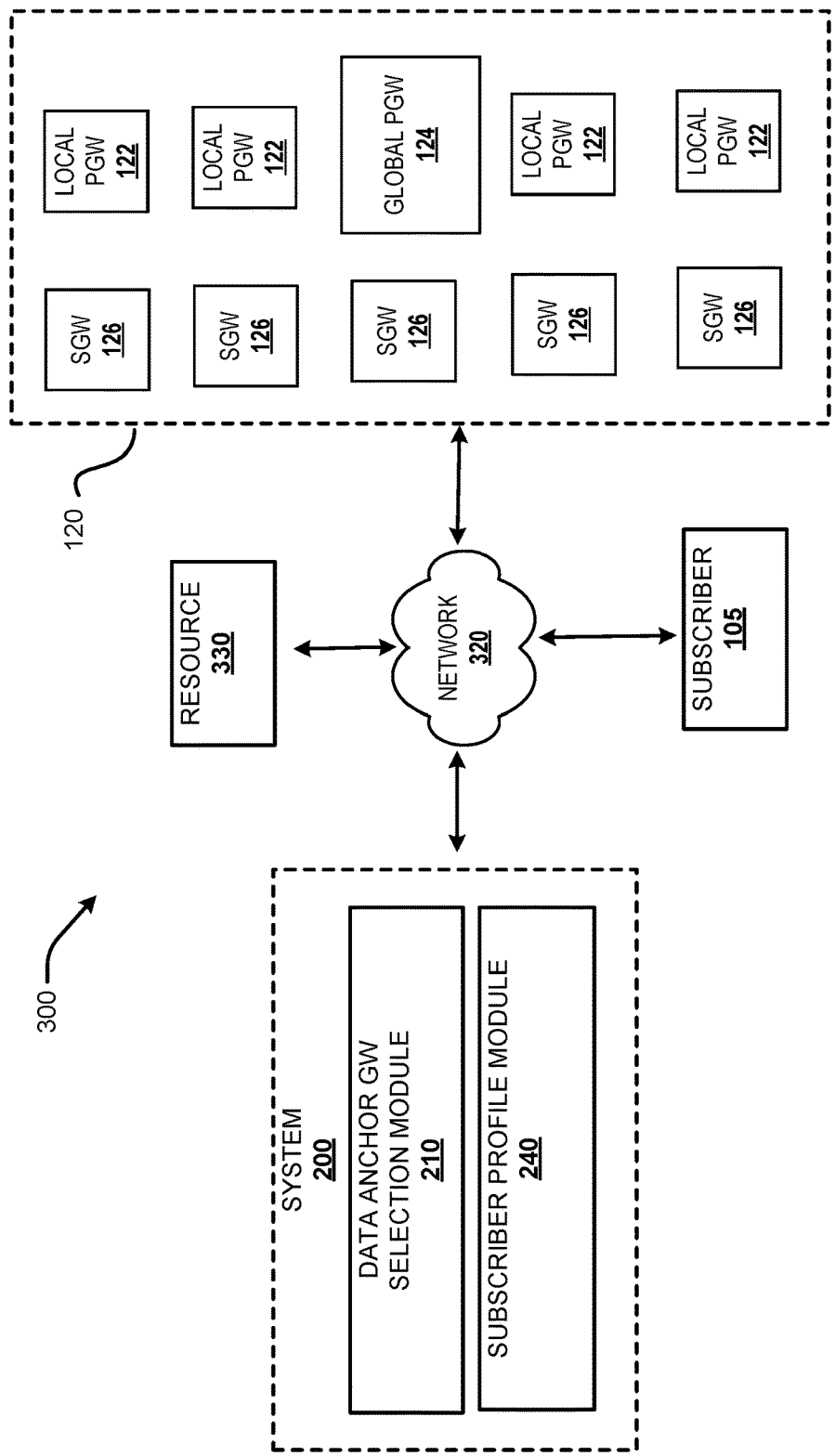
FIG. 3 illustrates an example operation environment of the example system of FIG. 2.

FIG. 3 illustrates an operation environment 300 of system 200. System 200 is configured to communicate with data anchor gateways 122/124 of EPC 120 through network 320. Environment 300 may also include a resource 330 which system 200 may take advantage of in its operations. For example, resource 330 may provide cloud based data storage for system 200 and/or may provide rules in the operation of system 200, e.g., the rules used in the operation of a threshold adjusting unit 220. Subscriber 105 illustrated as a user equipment may communicate with system 200 and/or EPC 120 via network 320. It should be appreciated that network 320 may include different types of networks and all are included in the disclosure. For example, subscriber 105 may connect to data anchor gateway 122/124 through radio access network 110. Data anchor gateway selection module 210 may communicate with data anchor gateways 122/124 through S5/S8 data plane interface.

In operation, data anchor gateway selection module 210 is configured to determine a data anchor gateway 122 or 124 to provide access to packet data network 142. In an example, based on a mobility score of a subscriber 105, data anchor gateway selection module 210 is configured to select either one of a local data anchor gateway 122 or a global data anchor gateway 124 for the subscriber 105 to access packet data network 142. Specifically, subscriber mobility score receiving unit 212 is configured to receive a mobility score of a subscriber 105. The mobility score may include at least one of a mobility propensity score and a mobility sensitivity score. Mobility propensity score indicates a likelihood that a subscriber 105 moves across a local cell site 114 during a session of network access. In an example, a mobility event may be defined as any change of geographic location across the cell site(s) 114 where a subscriber 105 is initially positioned. Mobility sensitivity score indicates whether a subscriber's network access session will be affected by a mobility event, e.g., whether a switching of local data anchor gateway 122 is required. In an example, mobility sensitivity score may depend on the type of network access session a subscriber 105 is engaged with and/or may depend on the specifics of the mobility event of the subscriber 105. Various factors may be considered to determine whether switching local data anchor gateway 122 is required in response to a mobility event of subscriber 105. For example, such factors may include capacities, loads, geographical proximity of the local data anchor gateways 122 involved in the mobility event of subscriber 105. The types of application/services launched through packet data network 142 may also be considered. The mobility propensity score and the mobility sensitivity score may be maintained as two separate scores and/or may be integrated together in certain manners, which are all included in the disclosure.

Gateway selection unit 214 is configured to select a data anchor gateway 122/124 based on the received mobility score of subscriber 105. In an example, gateway selection unit 214 determines using one of a local data anchor gateway 122 or a global data anchor gateway 124 as the data anchoring point for subscriber 105 to access packet data network 142. This selection is essentially between a centralized network architecture (i.e., using global data anchor gateway 124) and a distributed network architecture (i.e., using a local data anchor gateway 122), both of which coexist in EPS 100. In an example, the received mobility score of subscriber 105 is compared with a mobility score threshold. If the received mobility score is lower than the mobility score threshold, indicating, e.g., that the subscriber 105 is less likely to move across local cell site 114 and/or the mobility event is less likely to cause switching local data anchor gateway 122, gateway selection unit 214 may determine using a local data anchor gateway 122 to connect subscriber 105 to packet data network 142. If the received mobility score is higher than the mobility score threshold, indicating, e.g., that the subscriber 105 is more likely to move across local cell site 114 and/or the mobility event is more likely to cause switching local data anchor gateway 122, gateway selection unit 214 may determine using a global data anchor gateway 124 to connect subscriber 105 to packet data network 142.

Propensity score analyzing unit 216 is configured to analyze a received mobility propensity score of the subscriber 105 to determine whether the subscriber 105 is likely to move across a local cell site 114 associated to a local data anchor gateway 122 through a base station 112. Sensitivity score analyzing unit 218 is configured to analyze a received mobility sensitivity score of the subscriber 105 to determine whether a mobility event of the subscriber 105 will likely cause switching of data anchor point from one local data anchor gateway 122 to another data anchor gateway 122. There are various approaches to determine an initial local data anchor gateway 122 for a subscriber 105 and various approaches to determine switching local data anchor gateways 122, any and all such approaches may be considered in the operation of sensitivity score analyzing unit 218, and are included in the disclosure. In an example, propensity score analyzing unit 216 and/or sensitivity score analyzing unit 218 may apply a threshold(s) in the operations thereof.

Threshold adjusting unit 220 is configured to adjust the mobility score threshold and/or the thresholds used in the operations of propensity score analyzing unit 216 and sensitivity score analyzing unit 218. The adjusting may be based on monitoring the operations of local data anchor gateways 122 and/or global data anchor gateway(s) 124. For example, the monitoring may provide information about the load and bandwidth information of local data anchor gateways 122 and/or global data anchor gateway(s) 124. In an example, if the monitoring indicates that the relevant local data anchor gateways 122 are overloaded, threshold adjusting unit 220 may lower the mobility score threshold so that it becomes more likely that global data anchor gateway 124 be used as the data anchor point for a subscriber 105 to access packet data network 140. In an example, a rule may be applied in adjusting the threshold. For example, a rule may provide that a priority is given to local data anchor gateways 122 over global data anchor gateways 124 in determining threshold adjustment.

Local data anchor gateway selection/switching unit 222 is configured to select a specific local data anchor gateway 122 for a subscriber 105 to access packet data network 142 through the distributed network. There are various approaches to select a local data anchor gateway 122 and all are included in the disclosure. For example, gateway selection unit 214 may select a local data anchor gateway 122 considering geographical proximity, loads, capacities/bandwidths, overall routes leading subscriber 105 to target server 140, etc.

Local data anchor gateway selection/switching unit 222 is also configured to switch a network access point of a subscriber 105 from one local data anchor gateway 122 to another local data anchor gateway 122. In an example, the switching of local data anchor gateways 122 may be determined based on a mobility event of the subscriber 105. After a subscriber 105 moves from one cell site 114 to another cell site 114, the original local data anchor gateway 122 may become less optimal and another local data anchor gateway 122 may be determined as the optimal one such the network access point is switched to the new local data anchor gateway 122. Various parameters/factors may be used in the local data anchor gateway switching and all are included in the disclosure. In an example, switching of local data anchor gateway 122 may happen when local data anchor gateway selection/switching unit 222 detects that a serving gateway 126 linked to the subscriber 105 is associated to a cell site 114 of a different local data anchor gateway 122 than the original local data anchor gateway 122.

Local data anchor gateway selection/switching unit 222 may also switch the network access point between global data anchor gateway 124 and local data anchor gateway 122. All possible ways of data anchor point switching are included in the disclosure. In an example, Anchor point switching unit 222 may apply a rule in deciding the data anchor point switching. The rules may be provided by resource 330. In an example, a rule may provide that local data anchor gateways 122 have a priority over global data anchor gateway 124 in determining the to-be-switched-to data anchor gateway if the original data anchor point in a local data anchor gateway 122.

Subscriber profile module 240 is configured to generate a mobility score of a subscriber 105. Specifically, data collection unit 242 collects mobility related data of a subscriber 105. Any and all information related to a subscriber's mobility may be collected and included in the disclosure. In an example, at least one of historical mobility information and contextual mobility information of the subscriber may be collected. The historical mobility data relates to past mobility events of a subscriber 105, and may be collected by an operator of EPS 100, e.g., MME 128 may collect location information of a subscriber 105, or may be provided by resource 330 and/or obtained from a third-party data provider. Contextual mobility information relates to a context under which a subscriber 105 conducts a mobility event and/or accesses packet data network 140. For an illustrative example, if a subscriber 105 is positioned at a train station, such context information may indicate that the subscriber 105 is likely to move across local cell sites 114. Any approaches to collect contextual mobility information may be used and all are included in the disclosure. For example, a global positioning system (GPS) sensor included in a user equipment of a subscriber 105 may be used to determine a geographic context of the subscriber 105.

Historical mobility data analyzing unit 244 and contextual mobility data analyzing units 246 are configured to analyze historical mobility data and contextual mobility data of a subscriber 105, respectively, to determine a mobility propensity score and/or a mobility sensitivity score of the subscriber 105.

Integrating unit 248 is configured to integrate the mobility propensity score and the mobility sensitivity score into a mobility score. Various approaches may be used to integrate the two scores and all are included in the disclosure. For example, the mobility propensity score ("P") and mobility sensitivity score ("S") may be integrated as a combination ("P+S"), a product ("P×S"), or may be maintained as two separate scores contained in a single piece of data stream.

In an example, the mobility score may be dynamically generated and updated and may be obtained specifically for the moment a subscriber 105 is accessing packet data network 140. For example, a subscriber 105 may have high mobility score in the weekday morning time slots when he/she is supposed to commute to work. The same subscriber 105 may have a relatively low mobility score during the day when he/she is supposed to stay at workplace relatively stable. A subscriber 105 may have a high mobility score when he/she is located at a train station and may have a low mobility score when he/she is located in a shopping mall. As the mobility score may be generated dynamically in substantially real time, high speed communication network may be required for the collection and transit of mobility related data, e.g., the contextual mobility data.

2. Example Operation Flows

Figure 4:
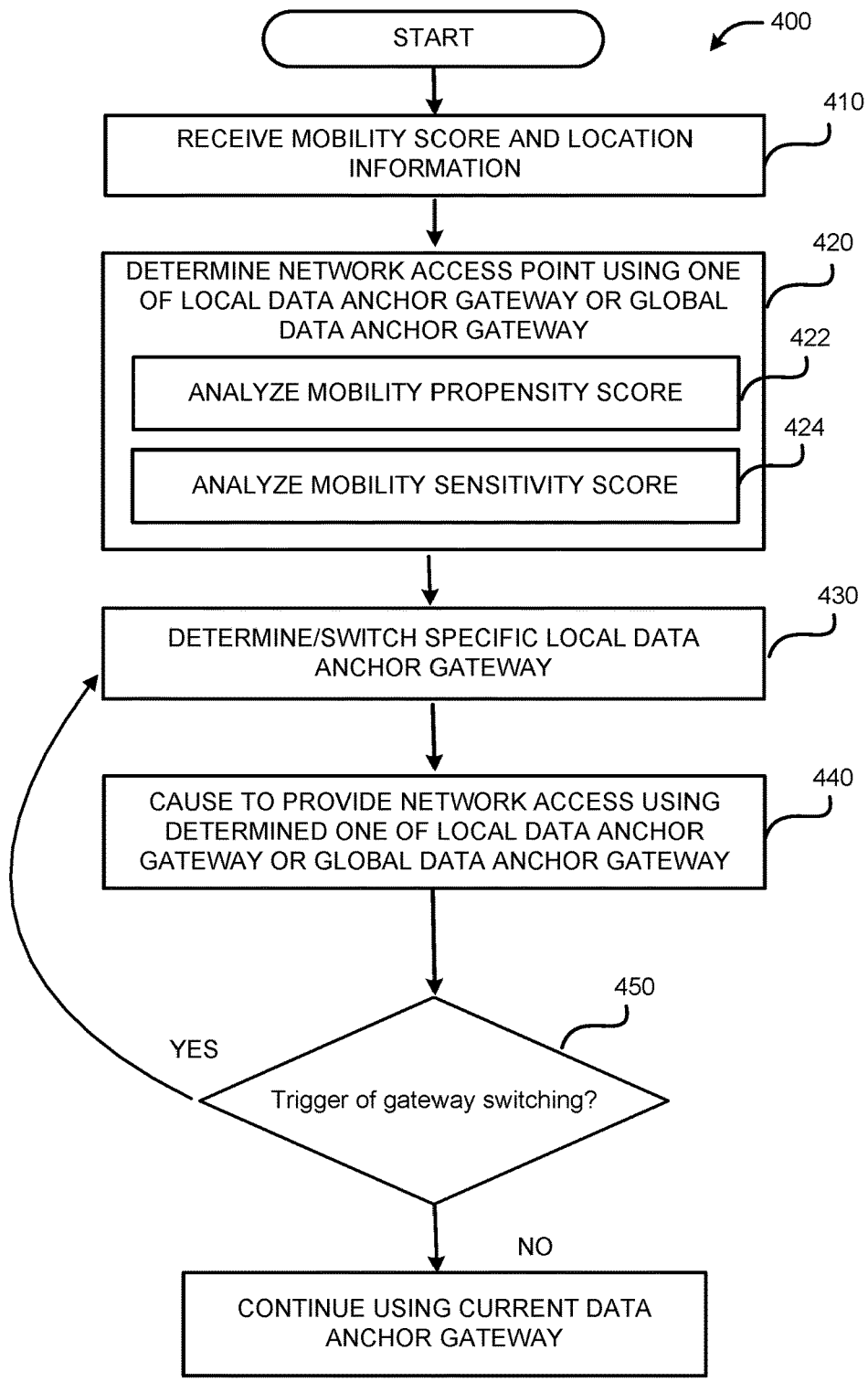
FIG. 4 illustrates an example operation process for selecting data anchor points based on subscriber mobility.

Referring now to FIG. 4, which illustrates an example flow chart of a process 400 of an example operation of system 200. In example operation 410, subscriber mobility score receiving unit 212 may receive a mobility score and a location information of a subscriber 105. The mobility score may be received from subscriber profile module 240. The location information may be received from/at MME 150. The mobility score may include at least one of a mobility propensity score and a mobility sensitivity score. The mobility propensity score and the mobility sensitivity score may be maintained as two separate scores and/or may be integrated together in certain manner, which are all included in the disclosure.

In example operation 420, gateway selection unit 214 may determine providing network access to subscriber 105 using one of a local data anchor gateway 122 or a global data anchor gateway 124 based on the mobility score of the subscriber 105. This selection between global data anchor gateway 124 and a local data anchor gateway 122 is basically directed to using either a centralized network architecture or a distributed network architecture, which coexist in EPS 100. In an example, the received mobility score of the subscriber 105 is compared with a mobility score threshold. If the received mobility score is lower than the mobility score threshold, gateway selection unit 214 may determine using a local data anchor gateway 122 to connect subscriber 105 to packet data network 142. If the mobility score of the subscriber 105 is higher than the mobility score threshold, gateway selection unit 214 may determine using a global data anchor gateway 124 to connect subscriber 105 to packet data network 142.

In the case that the received mobility score includes a mobility propensity score and/or a mobility sensitivity score, example operation 420 may include two sub-operations 422 and 424. In sub-operation 422, propensity score analyzing unit 216 may analyze the received mobility propensity score of the subscriber 105 to determine whether the subscriber 105 is likely to move across/beyond a cell site 114 associated to a local data anchor gateway 122 through a base station 112. In sub-operation 424, sensitivity score analyzing unit 218 may analyze a received mobility sensitivity score of the subscriber 105 to determine whether a mobility event of the subscriber 105 will likely cause switching of data anchor point from one local data anchor gateway 122 to another local data anchor gateway 122. Sub-operations 422 and 424 may be performed separately or may be performed in a linked manner. In an example, sub-operation 424 may only be performed if sub-operation 422 indicates that subscriber 105 is likely to move across local cell sites 114. Sub-operations 422 and 424 may also include using thresholds, which may be provided and adjusted by threshold adjusting unit 220.

In example operation 430, local data anchor gateway selection/switching unit 222 may select a specific local data anchor gateway 122 for a subscriber 105 to access packet data network 142. There are various approaches to select a local data anchor gateway 122 and all are included in the disclosure. For example, local data anchor gateway selection/switching unit 222 may select a local data anchor gateway 122 based on geographical proximity, loads, capacities, overall routes leading subscriber 105 to target server 140, etc. In an example, a local data anchor gateway 122, e.g., a packet data network gateway (PGW), associated to a cell site 114 where the subscriber 105 is located may be selected as the data anchor point.

In example operation 440, data anchor point selection module 210 cause MME 150 to use the determined one of the local data anchor gateway 122 or the global data anchor gateway 124 to provide network access to the subscriber 105.

In example operation 450, it is determined whether a gateway switching trigger exists. If such a trigger exists, e.g., subscriber 105 moves across local cell site 114 associated to the current local data anchor gateway 122, the operations return to example operation 420 to determine a new local data anchor gateway 122 to switch the data anchor point.

It should be appreciated that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be appreciated that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with FIGS. 2 and 3, the operations of example process 400 are described herein as being implemented, at least in part, by an application, component, and/or circuit. Although the described illustration refers to the components of FIGS. 1, 2 and 3, it can be appreciated that the operations of the process 400 may be also implemented in many other ways. For example, process 400 may be implemented, at least in part, by computer processor or processor of separate computers. In addition, one or more of the operations of the processes 400 may alternatively or additionally be implemented, at least in part, by a computer working alone or in conjunction with other software modules, such as a server module.

3. Example System Components

A computing device where any one or more of the units of system 200 of FIG. 2 are located may be in the form of a personal computer, a wearable computing device, a mobile phone, or any other device having components for processing and communicating data. For example, a computing device may be a tablet having one or more user-machine interface such as a display interface and/or an input device. A display interface may include a monitor, a projection surface, a touch screen, and/or any other interface device capable of displaying. In addition, an input device may include a camera, a microphone, a keyboard or any other input device, capable of inputting data to the computing device.

The computing device may also include a local memory that is capable of storing, communicating, and processing input data, output data, and other data. The local memory may also include a program module configured to manage techniques described herein including the one or more of the units of system 200 of FIG. 2.

Figure 5:
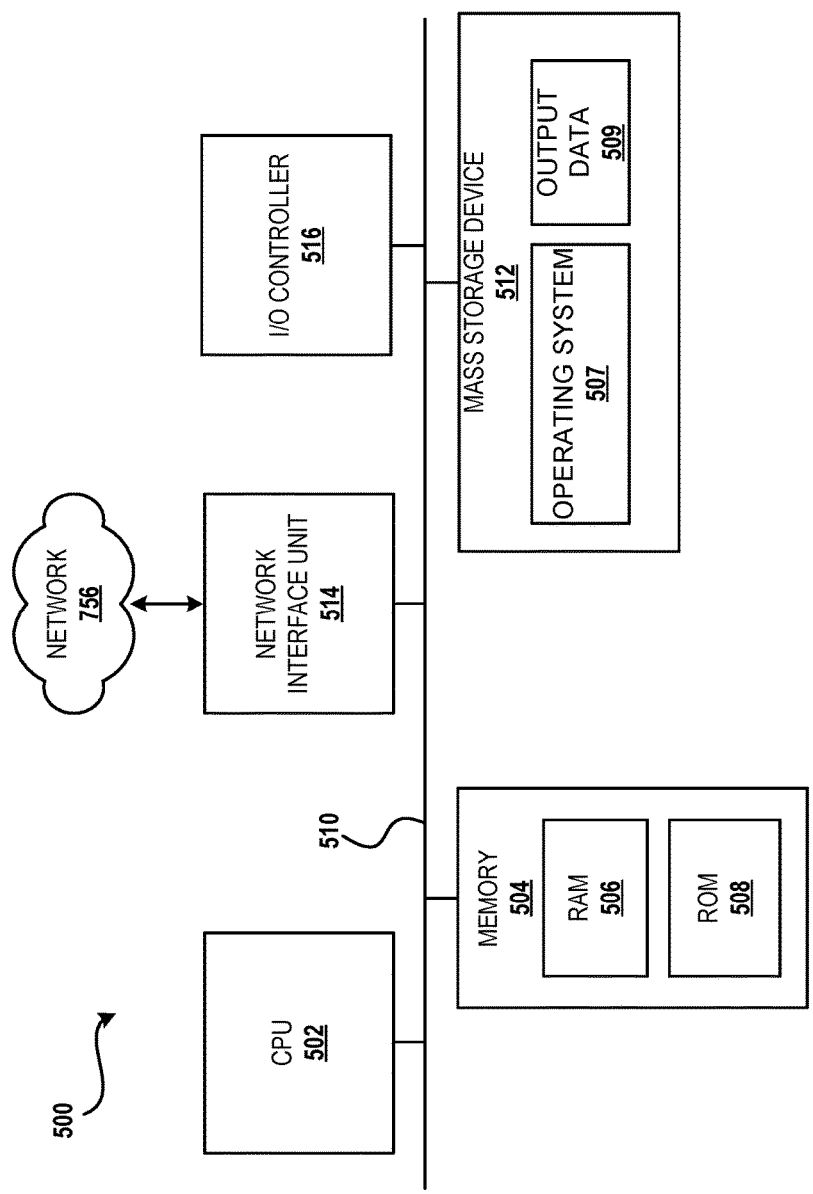
FIG. 5 illustrates an example computer architecture diagram illustrating an illustrative computer hardware and software architecture for a computing system capable of implementing aspects of the techniques and technologies presented herein.

FIG. 5 shows additional details of an example computer architecture 500 for a computer, on which one or more of the units of system 200 of FIG. 2 may be located, and which is capable of executing the program components including the units of system 200 described herein. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, data, such as the output data 509, and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and without limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 756 and/or another network (not shown). The computer architecture 500 may connect to the network 756 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components of system 200 described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

Figure 6:
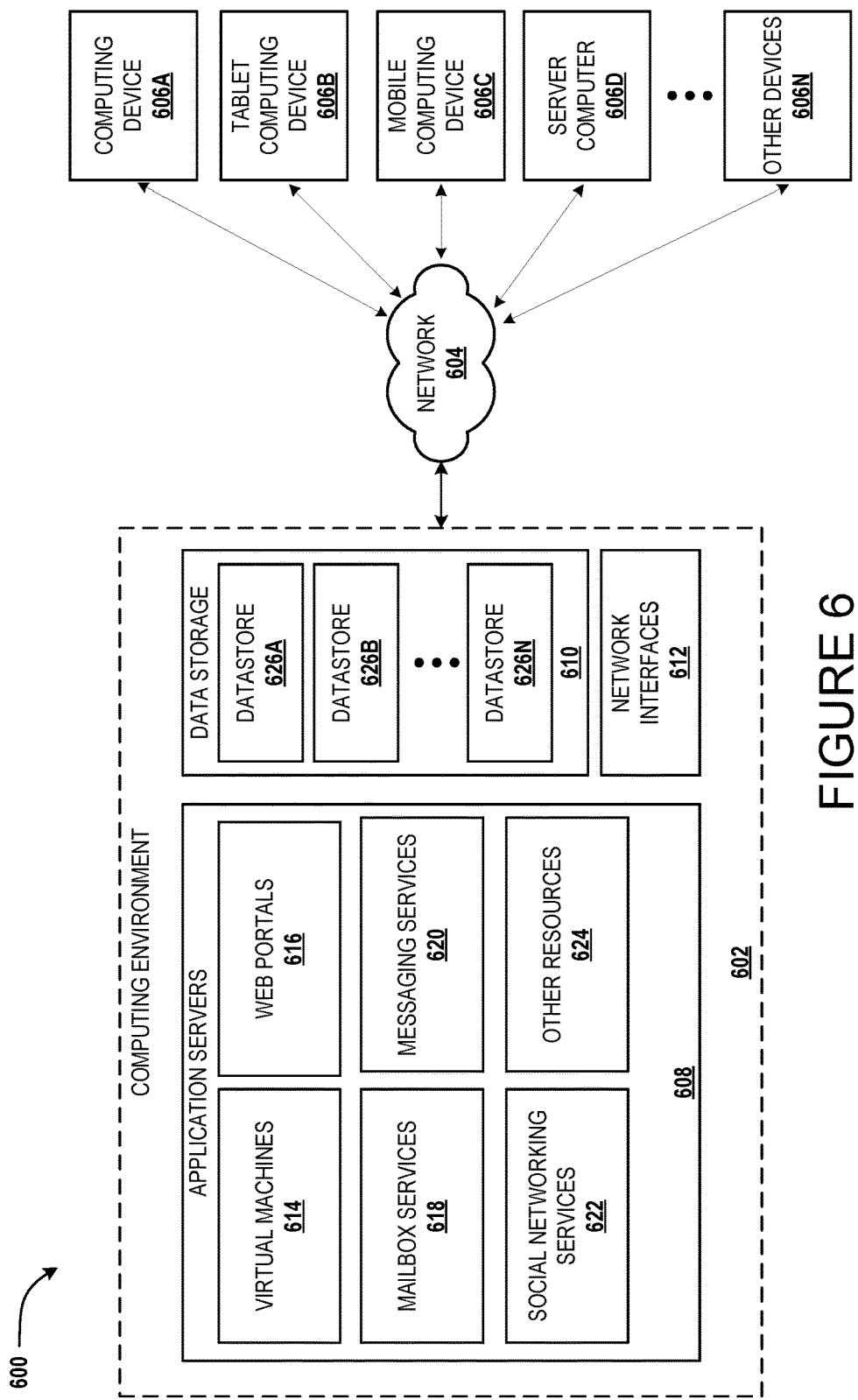
FIG. 6 illustrates a diagram illustrating an example distributed computing environment capable of implementing aspects of the techniques and technologies presented herein.

FIG. 6 depicts an illustrative distributed computing environment 600 capable of executing the software components of system 200 described herein for selecting a data anchor point for a subscriber to access external packet data network. Thus, the distributed computing environment 600 illustrated in FIG. 6 can be utilized to execute any aspects of the software components presented herein. For example, the distributed computing environment 600 can be utilized to execute aspects of the web browser 510, the system 200 and/or any units thereof and/or other software components described herein.

According to various implementations, the distributed computing environment 600 includes a computing environment 602 operating on, in communication with, or as part of the network 604. The network 604 may be or may include the network 756, described above with reference to FIG. 5. The network 604 also can include various access networks. One or more client devices 606A-606N (hereinafter referred to collectively and/or generically as "clients 606") can communicate with the computing environment 602 via the network 604 and/or other connections (not illustrated in FIG. 6). In one illustrated configuration, the client devices 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602. Two example computing architectures for the client devices 606 are illustrated and described herein with reference to FIGS. 5 and 7. It should be understood that the illustrated clients 606 and computing architectures illustrated and described herein are illustrative, and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for providing intelligent configuration of data visualizations. It should be understood that this configuration is illustrative, and should not be construed as being limiting in any way. The application servers 608 also host or provide access to one or more portals, link pages, Web sites, and/or other information ("Web portals") 616.

According to various implementations, the application servers 608 also include one or more mailbox services 618 and one or more messaging services 620. The mailbox services 618 can include electronic mail ("email") services. The mailbox services 618 also can include various personal information management ("PIM") services including, but not limited to, calendar services, contact management services, collaboration services, and/or other services. The messaging services 620 can include, but are not limited to, instant messaging services, chat services, forum services, and/or other communication services.

The application servers 608 also may include one or more social networking services 622. The social networking services 622 can include various social networking services including, but not limited to, services for sharing or posting status updates, instant messages, links, photos, videos, and/or other information; services for commenting or displaying interest in articles, products, blogs, or other resources; and/or other services.

The social networking services 622 also can include commenting, blogging, and/or micro blogging services. For instance, a social networking application, mail client, messaging client or a browser running on a phone or any other client 606 may communicate with a networking service 622 and facilitate the functionality, even in part, described above with respect to FIGS. 2, 3 and 4.

As shown in FIG. 6, the application servers 608 also can host other services, applications, portals, and/or other resources ("other resources") 624. The other resources 624 can include, but are not limited to, document sharing, rendering or any other functionality. It thus can be appreciated that the computing environment 602 can provide integration of the concepts and technologies disclosed herein provided herein with various mailbox, messaging, social networking, and/or other services or resources.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more server computers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the application servers 608 and/or other data. Although not illustrated in FIG. 6, the datastores 626 also can host or store web page documents, word documents, presentation documents, data structures, algorithms for execution by a recommendation engine, and/or other data utilized by any application program or another module, such as the content manager 105. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the clients 606. It should be understood that the clients 606 can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing intelligent configuration of data visualizations, among other aspects. In one specific example, as summarized above, techniques described herein may be implemented, at least in part, by the web browser application 510 of FIG. 5, which works in conjunction with the application servers 608 of FIG. 6.

Turning now to FIG. 7, an illustrative computing device architecture 700 for a computing device that is capable of executing various software components described herein for providing system 200. The computing device architecture 700 is applicable to computing devices that facilitate mobile computing due, in part, to form factor, wireless connectivity, and/or battery-powered operation. In example configurations, the computing devices include, but are not limited to, mobile telephones, tablet devices, slate devices, portable video game devices, and the like. The computing device architecture 700 is applicable to any of the client devices 606 shown in FIG. 6. Moreover, aspects of the computing device architecture 700 may be applicable to traditional desktop computers, portable computers (e.g., laptops, notebooks, ultra-portables, and netbooks), server computers, and other computer systems, such as described herein with reference to FIG. 5. For example, the single touch and multi-touch aspects disclosed herein below may be applied to desktop computers that utilize a touchscreen or some other touch-enabled device, such as a touch-enabled track pad or touch-enabled mouse.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, a touch-enabled input.

In example configurations, the processor 702 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In example configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, Calif. and others.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., and ANDROID OS from Google Inc. of Mountain View, Calif. Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only one network 756 is illustrated, the network connectivity components 706 may facilitate simultaneous communication with multiple networks, including the network 604 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or adapted to provide voice and/or data communications in accordance with future generation technologies.

In example configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, compasses, temperature sensors or shock detection sensors, also may be incorporated in the computing device architecture 700.

The magnetometer 728 is configured to measure the strength and direction of a magnetic field. In some configurations the magnetometer 728 provides measurements to a compass application program stored within one of the memory components 704 in order to provide a user with accurate directions in a frame of reference including the cardinal directions, north, south, east, and west. Similar measurements may be provided to a navigation application program that includes a compass component. Other uses of measurements obtained by the magnetometer 728 are contemplated.

The ambient light sensor 730 is configured to measure ambient light. In some configurations, the ambient light sensor 730 provides measurements to an application program stored within one the memory components 704 in order to automatically adjust the brightness of a display (described below) to compensate for low-light and high-light environments. Other uses of measurements obtained by the ambient light sensor 730 are contemplated.

The proximity sensor 732 is configured to detect the presence of an object or thing in proximity to the computing device without direct contact. In some configurations, the proximity sensor 732 detects the presence of a user's body (e.g., the user's face) and provides this information to an application program stored within one of the memory components 704 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 732 are contemplated.

The accelerometer 734 is configured to measure proper acceleration. In some configurations, output from the accelerometer 734 is used by an application program as an input mechanism to control some functionality of the application program. For example, the application program may be a video game in which a character, a portion thereof, or an object is moved or otherwise manipulated in response to input received via the accelerometer 734. In some configurations, output from the accelerometer 734 is provided to an application program for use in switching between landscape and portrait modes, calculating coordinate acceleration, or detecting a fall. Other uses of the accelerometer 734 are contemplated.

The gyroscope 736 is configured to measure and maintain orientation. In some configurations, output from the gyroscope 736 is used by an application program as an input mechanism to control some functionality of the application program. For example, the gyroscope 736 can be used for accurate recognition of movement within a 3D environment of a video game application or some other application. In some configurations, an application program utilizes output from the gyroscope 736 and the accelerometer 734 to enhance control of some functionality of the application program. Other uses of the gyroscope 736 are contemplated.

The GPS sensor 738 is configured to receive signals from GPS satellites for use in calculating a location. The location calculated by the GPS sensor 738 may be used by any application program that requires or benefits from location information. For example, the location calculated by the GPS sensor 738 may be used with a navigation application program to provide directions from the location to a destination or directions from the destination to the location. Moreover, the GPS sensor 738 may be used to provide location information to an external location-based service, such as E911 service. The GPS sensor 738 may obtain location information generated via WI-FI, WIMAX, and/or cellular triangulation techniques utilizing one or more of the network connectivity components 706 to aid the GPS sensor 738 in obtaining a location fix. The GPS sensor 738 may also be used in Assisted GPS ("A-GPS") systems.

As one should appreciate, one or more of the sensors may be used in detecting contextual information of a user as described in FIGS. 2 and 3.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interface described below, or may include processing functionality built-in to the processor 702.

The display 740 is an output device configured to present information in a visual form. In particular, the display 740 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 740 is a liquid crystal display ("LCD") utilizing any active or passive matrix technology and any backlighting technology (if used). In some configurations, the display 740 is an organic light emitting diode ("OLED") display. Other display types are contemplated.

The touchscreen 742, also referred to herein as a "touch-enabled screen," is an input device configured to detect the presence and location of a touch. The touchscreen 742 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 742 is incorporated on top of the display 740 as a transparent layer to enable a user to use one or more touches to interact with objects or other information presented on the display 740. In other configurations, the touchscreen 742 is a touch pad incorporated on a surface of the computing device that does not include the display 740. For example, the computing device may have a touchscreen incorporated on top of the display 740 and a touch pad on a surface opposite the display 740.

In example configurations, the touchscreen 742 is a single-touch touchscreen. In other configurations, the touchscreen 742 is a multi-touch touchscreen. In some configurations, the touchscreen 742 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 742. As such, a developer may create gestures that are specific to a particular application program.

In example configurations, the touchscreen 742 supports a tap gesture in which a user taps the touchscreen 742 once on an item presented on the display 740. The tap gesture may be used for various reasons including, but not limited to, opening or launching whatever the user taps. In some configurations, the touchscreen 742 supports a double tap gesture in which a user taps the touchscreen 742 twice on an item presented on the display 740. The double tap gesture may be used for various reasons including, but not limited to, zooming in or zooming out in stages. In some configurations, the touchscreen 742 supports a tap and hold gesture in which a user taps the touchscreen 742 and maintains contact for at least a pre-defined time. The tap and hold gesture may be used for various reasons including, but not limited to, opening a context-specific menu.

In example configurations, the touchscreen 742 supports a pan gesture in which a user places a finger on the touchscreen 742 and maintains contact with the touchscreen 742 while moving the finger on the touchscreen 742. The pan gesture may be used for various reasons including, but not limited to, moving through screens, images, or menus at a controlled rate. Multiple finger pan gestures are also contemplated. In example configurations, the touchscreen 742 supports a flick gesture in which a user swipes a finger in the direction the user wants the screen to move. The flick gesture may be used for various reasons including, but not limited to, scrolling horizontally or vertically through menus or pages. In some configurations, the touchscreen 742 supports a pinch and stretch gesture in which a user makes a pinching motion with two fingers (e.g., thumb and forefinger) on the touchscreen 742 or moves the two fingers apart. The pinch and stretch gesture may be used for various reasons including, but not limited to, zooming gradually in or out of a website, map, or picture.

Although the above gestures have been described with reference to the use one or more fingers for performing the gestures, other appendages such as toes or objects such as styluses may be used to interact with the touchscreen 742. As such, the above gestures should be understood as being illustrative and should not be construed as being limiting in any way.

The data I/O interface component 744 is configured to facilitate input of data to the computing device and output of data from the computing device. In some configurations, the data I/O interface component 744 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 746 is configured to provide audio input and/or output capabilities to the computing device. In some configurations, the audio I/O interface component 746 includes a microphone configured to collect audio signals. In some configurations, the audio I/O interface component 746 includes a headphone jack configured to provide connectivity for headphones or other external speakers. In some configurations, the audio I/O interface component 746 includes a speaker for the output of audio signals. In some configurations, the audio I/O interface component 746 includes an optical audio cable out.

The video I/O interface component 748 is configured to provide video input and/or output capabilities to the computing device. In some configurations, the video I/O interface component 748 includes a video connector configured to receive video as input from another device (e.g., a video media player such as a DVD or BLURAY player) or send video as output to another device (e.g., a monitor, a television, or some other external display). In some configurations, the video I/O interface component 748 includes a High-Definition Multimedia Interface ("HDMI"), mini-HDMI, micro-HDMI, DisplayPort, or proprietary connector to input/output video content. In some configurations, the video I/O interface component 748 or portions thereof is combined with the audio I/O interface component 746 or portions thereof.

The camera 750 can be configured to capture still images and/or video. The camera 750 may utilize a charge coupled device ("CCD") or a complementary metal oxide semiconductor ("CMOS") image sensor to capture images. In some configurations, the camera 750 includes a flash to aid in taking pictures in low-light environments. Settings for the camera 750 may be implemented as hardware or software buttons.

Although not illustrated, one or more hardware buttons may also be included in the computing device architecture 700. The hardware buttons may be used for controlling some operational aspect of the computing device. The hardware buttons may be dedicated buttons or multi-use buttons. The hardware buttons may be mechanical or sensor-based.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The battery gauge 754 can be configured to measure battery parameters such as current, voltage, and temperature. In some configurations, the battery gauge 754 is configured to measure the effect of a battery's discharge rate, temperature, age and other factors to predict remaining life within a certain percentage of error. In some configurations, the battery gauge 754 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 712 may also include a power connector, which may be combined with one or more of the aforementioned I/O components 710. The power components 712 may interface with an external power system or charging equipment via an I/O component.

The disclosure presented herein may be considered in view of the following embodiments.

Clause 1: A computer-implemented system for providing network access to a subscriber, the system comprising: one or more processors; and computer readable storage medium communicatively coupled with the one or more processors, the computer readable medium having computer executable instructions stored therein, which when executed, causes the computer-implemented system to: receive a mobility score of the subscriber; determine providing network access to the subscriber using one of a local data anchor gateway or a global data anchor gateway based on the mobility score of the subscriber; and cause to provide network access to the subscriber using the determined one of the local data anchor gateway or the global data anchor gateway.

Clause 2: the computer-implemented system of clause 1, wherein the determining includes: determining providing network access to the subscriber using the local data anchor gateway if the mobility score of the subscriber is lower than a threshold; and determining providing network access to the subscriber using the global data anchor gateway if the mobility score of the subscriber is higher than the threshold.

Clause 3: the computer-implemented system of clause 1, wherein the mobility score includes at least one of a mobility propensity score and a mobility sensitivity score.

Clause 4: the computer-implemented system of clause 1, wherein the mobility score is determined based on at least one of historical mobility information and contextual mobility information of the subscriber.

Clause 5: the computer-implemented system of clause 1, wherein the subscriber includes at least one of a user, a subscribed user equipment, or an user account.

Clause 6: the computer-implemented system of clause 1, wherein the computer executable instructions are configured to further cause the computer-implemented system to switch a network access point of the subscriber from a first local data anchor gateway to a second local data anchor gateway based on a mobility event of the subscriber.

Clause 7: the computer-implemented system of clause 6, wherein the switching includes detecting that a serving gateway assigned to the subscriber is associated to a cell site of the second data anchor local gateway.

Clause 8: the computer-implemented system of clause 1, wherein the local data anchor gateway includes a packet data network gateway associated to a cell site where the subscriber is located.

Clause 9: the computer-implemented system of claim 1, wherein the local data anchor gateway is associated to one or more cell sites which at least partially overlap with and cover a local area smaller than a global area associated to the global data anchor gateway.

Clause 10: a computer-implemented method for providing network access to a subscriber, comprising: receiving a mobility score of the subscriber; determining providing network access to the subscriber using one of a local data anchor gateway or a global data anchor gateway based on the mobility score of the subscriber; and causing to provide network access to the subscriber using the determined one of the local data anchor gateway or the global data anchor gateway.

Clause 11: the computer-implemented method of clause 10, wherein the determining includes: determining providing network access to the subscriber using the local data anchor gateway if the mobility score of the subscriber is lower than a threshold; and determining providing network access to the subscriber using the global data anchor gateway if the mobility score of the subscriber is higher than the threshold.

Clause 12: the computer-implemented method of clause 11, further comprising adjusting the threshold based on monitoring an operation of at least one of the local data anchor gateway and the global data anchor gateway.

Clause 13: the computer-implemented method of claim 12, further comprising applying a rule in the adjusting the threshold.

Clause 14: the computer-implemented method of clause 10, wherein the mobility score includes at least one of a mobility propensity score and a mobility sensitivity score.

Clause 15: the computer-implemented system of clause 10, wherein the mobility score is determined based on at least one of historical mobility information and contextual mobility information of the subscriber.

Clause 16: the computer-implemented method of clause 10, wherein the local data anchor gateway is associated to one or more cell sites which at least partially overlap with and cover a local area smaller than a global area associated to the global data anchor gateway.

Clause 17: a server for supporting an evolved packet core (EPC) under 3GPP core network architecture, comprising: one or more processors; and computer readable storage medium communicatively coupled with the one or more processors, the computer readable medium having computer executable instructions stored therein, which when executed, causes the one or processors to collect mobility information of a subscriber; process the collected mobility data to generate a mobility score of the subscriber; determine providing network access to the subscriber using one of a local data anchor gateway or a global data anchor gateway based on the mobility score of the subscriber; and provide network access to the subscriber using the determined one of the local data anchor gateway or the global data anchor gateway.

Clause 18: the sever of clause 17, wherein determining includes: determining providing network access to the subscriber using the local data anchor gateway if the mobility score of the subscriber is lower than a threshold; and determining providing network access to the subscriber using the global data anchor gateway if the mobility score of the subscriber is higher than the threshold.

Clause 19: the sever of clause 17, wherein the collecting the mobility information includes collecting at least one of historical mobility information and contextual mobility information of the subscriber.

Clause 20: the sever of clause 17, wherein the one or more processors are further configured to switch a network access point of the subscriber from a first local data anchor gateway to a second local data anchor gateway based on a mobility event of the subscriber.

The invention claimed is:

1. A computer-implemented system for providing network access to a subscriber, the system comprising:
   one or more processors; and
   a non-transitory computer readable storage medium communicatively coupled with the one or more processors, the non-transitory computer readable medium having computer executable instructions stored therein, which when executed, cause the computer-implemented system to:
   receive a mobility score of the subscriber;
   determine whether to provide network access to the subscriber using one of a local data anchor gateway or a global data anchor gateway based on the mobility score of the subscriber;
   cause network access to be provided to the subscriber using the determined one of the local data anchor gateway or the global data anchor gateway; and
   based on a rule, determine that network access for the subscriber should be switched from the determined one of the local data anchor gateway or the global data anchor gateway to another data anchor gateway, wherein the rule provides that local data anchor gateways have priority over the global data anchor gateway when an initially determined data anchor gateway is a local data anchor gateway.

2. The computer-implemented system of claim 1, wherein the computer executable instructions, when executed, further cause the computer-implemented system to:
   determine that network access is to be provided to the subscriber using the local data anchor gateway if the mobility score of the subscriber is lower than a threshold; and
   determine that network access is to be provided to the subscriber using the global data anchor gateway if the mobility score of the subscriber is higher than the threshold.

3. The computer-implemented system of claim 1, wherein the mobility score includes at least one of a mobility propensity score and a mobility sensitivity score.

4. The computer-implemented system of claim 1, wherein the mobility score is determined based on at least one of historical mobility information and contextual mobility information of the subscriber.

5. The computer-implemented system of claim 1, wherein the subscriber includes at least one of a user, a subscribed user equipment, or a user account.

6. The computer-implemented system of claim 1, wherein the computer executable instructions, when executed, further cause the computer-implemented system to switch a network access point of the subscriber from a first local data anchor gateway to a second local data anchor gateway based on a mobility event of the subscriber.

7. The computer-implemented system of claim 6, wherein the computer executable instructions, when executed, further cause the computer-implemented system to detect that a serving gateway assigned to the subscriber is associated with a cell site of the second data anchor local gateway.

8. The computer-implemented system of claim 1, wherein the local data anchor gateway includes a packet data network gateway associated with a cell site where the subscriber is located.

9. The computer-implemented system of claim 1, wherein the local data anchor gateway is associated with one or more cell sites which at least partially overlap with and cover a local area smaller than a global area associated with the global data anchor gateway.

10. A computer-implemented method for providing network access to a subscriber, comprising:
receiving a mobility score of the subscriber;
determining whether to provide network access to the subscriber using one of a local data anchor gateway or a global data anchor gateway based on the mobility score of the subscriber; and
causing network access to be provided to the subscriber using the determined one of the local data anchor gateway or the global data anchor gateway; and
based on a rule, determining that network access for the subscriber should be switched from the determined one of the local data anchor gateway or the global data anchor gateway to another data anchor gateway, wherein the rule provides that local data anchor gateways have priority over the global data anchor gateway when an initially determined data anchor gateway is a local data anchor gateway.

11. The computer-implemented method of claim 10, wherein the determining includes:
determining that network access is to be provided to the subscriber using the local data anchor gateway if the mobility score of the subscriber is lower than a threshold; and
determining that network access is to be provided to the subscriber using the global data anchor gateway if the mobility score of the subscriber is higher than the threshold.

12. The computer-implemented method of claim 11, further comprising adjusting the threshold based on monitoring an operation of at least one of the local data anchor gateway and the global data anchor gateway.

13. The computer-implemented method of claim 12, further comprising applying a rule in the adjusting of the threshold.

14. The computer-implemented method of claim 10, wherein the mobility score includes at least one of a mobility propensity score and a mobility sensitivity score.

15. The computer-implemented system of claim 10, wherein the mobility score is determined based on at least one of historical mobility information and contextual mobility information of the subscriber.

16. The computer-implemented method of claim 10, wherein the local data anchor gateway is associated with one or more cell sites which at least partially overlap with and cover a local area smaller than a global area associated with the global data anchor gateway.

17. A server for supporting an evolved packet core (EPC) under 3GPP core network architecture, comprising:
one or more processors; and
a non-transitory computer readable storage medium communicatively coupled with the one or more processors, the non-transitory computer readable medium having computer executable instructions stored therein, which when executed, causes the one or processors to:
collect mobility information of a subscriber;
process the collected mobility data to generate a mobility score of the subscriber;
determine whether to provide network access to the subscriber using one of a local data anchor gateway or a global data anchor gateway based on the mobility score of the subscriber;
provide network access to the subscriber using the determined one of the local data anchor gateway or the global data anchor gateway; and
based on a rule, determine that network access for the subscriber should be switched from the determined one of the local data anchor gateway or the global data anchor gateway to another data anchor gateway, wherein the rule provides that local data anchor gateways have priority over the global data anchor gateway when an initially determined data anchor gateway is a local data anchor gateway.

18. The server of claim 17, wherein the computer executable instructions, when executed, cause the one or more processors to:
determine that network access is to be provided to the subscriber using the local data anchor gateway if the mobility score of the subscriber is lower than a threshold; and
determine that network access is to be provided to the subscriber using the global data anchor gateway if the mobility score of the subscriber is higher than the threshold.

19. The server of claim 17, wherein the computer executable instructions for causing the one or more processors to collect the mobility information include computer executable instructions that, when executed, cause the one or more processors to collect at least one of historical mobility information and contextual mobility information of the subscriber.

20. The server of claim 17, wherein the computer executable instructions, when executed, cause the one or more processors to switch a network access point of the subscriber from a first local data anchor gateway to a second local data anchor gateway based on a mobility event of the subscriber.

* * * * *